United States Patent [19]

Ashe

[11] Patent Number: 4,746,225
[45] Date of Patent: May 24, 1988

[54] INSTRUMENT ASSEMBLY SUPPORT

[75] Inventor: John B. Ashe, Asheville, N.C.

[73] Assignee: Figgie International Inc., Richmond, Va.

[21] Appl. No.: 942,697

[22] Filed: Dec. 17, 1986

[51] Int. Cl.$^4$ .............................................. G01K 1/14
[52] U.S. Cl. ..................................... 374/208; 62/125; 73/384; 73/431
[58] Field of Search ...................... 374/208, 141, 142; 73/431

[56] References Cited

U.S. PATENT DOCUMENTS

| | | |
|---|---|---|
| 1,058,036 | 4/1913 | Clark . |
| 1,136,520 | 4/1915 | Fukami . |
| 1,273,238 | 7/1918 | Leon et al. . |
| 1,273,239 | 7/1918 | Leon et al. . |
| 1,315,326 | 9/1919 | Palis . |
| 1,357,893 | 11/1920 | Northrop . |
| 1,387,415 | 8/1921 | Lee . |
| 1,926,808 | 9/1933 | Hastings ............................ 374/208 |
| 2,294,545 | 9/1942 | Gelatt et al. .................... 374/208 X |
| 2,563,749 | 8/1951 | Rose et al. ...................... 374/208 X |
| 2,576,883 | 11/1951 | Koski . |
| 2,701,964 | 2/1955 | Argabrite ........................ 374/208 X |
| 2,808,219 | 10/1957 | Petrick . |
| 3,104,832 | 9/1963 | Ford . |
| 3,136,550 | 6/1964 | Ruderian . |
| 3,983,753 | 10/1976 | Greenleaf et al. ............... 374/208 X |
| 4,641,012 | 2/1987 | Roberts ........................... 374/208 X |

OTHER PUBLICATIONS

"Product Displays", Taylor (SYBRON) Catalog, pp. 1, 6, 7, Catalog No. A 5-000, 1985.

Primary Examiner—Daniel M. Yasich
Attorney, Agent, or Firm—Wood, Herron & Evans

[57] ABSTRACT

An instrument assembly for use with a wire rack. The assembly is constructed so that the case structure may be rotated closer to or further away from the base portion of the stand. The assembly may be firmly secured to the wire rack by clamping one of the wire elements between the base portion and case structure.

15 Claims, 2 Drawing Sheets

INSTRUMENT ASSEMBLY SUPPORT

The present invention is directed to an improved instrument assembly which is especially designed to be used with a wire rack.

In the prior art instrument assemblies, for example, thermometers, which have been designed for use with a wire rack are designed to be used above and/or below a rack. A hook is generally provided to the top portion of the assembly for placement below the rack and a stand is provided at the opposite end for placement on top of the wire rack. This type of construction is easily knocked over, moved aside or even knocked off the rack because of the low stability.

Applicant has invented an improved instrument assembly wherein there is provided a more stable structure for placement above or below a wire rack.

SUMMARY OF THE INVENTION

In one form of the present invention there is provided an instrument assembly for use with a wire rack comprising a stand, a base portion, and an upright portion. The case structure is mounted to the upright portion of the stand. The assembly is provided with means for clamping of a portion of at least one wire element of the wire rack.

In another form of the present invention there is provided an instrument assembly comprising a stand having a base portion and upright portion. A case structure is mounted to the upright portion of the stand. Means are provided to allow movement of the case portion either closer to or further away from the base portion to improve stability.

DETAILED DESCRIPTION OF THE INVENTION

Figure 1:
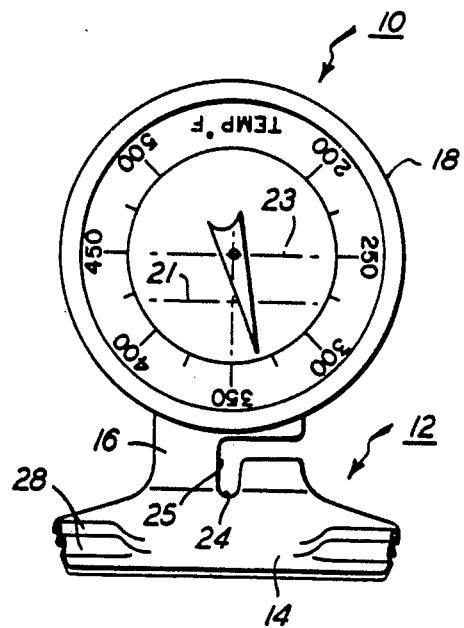
FIG. 1 is a front view of an instrument assembly made in accordance with the present invention.

Referring to FIG. 1, there is illustrated an instrument assembly 10 made in accordance with the present invention. In the particular embodiment illustrated the instrument assembly is a thermometer, however, the instrument assembly may be any instrument so desired, for example, a barometer. Instrument assembly 10 comprises a stand 12 having a base portion 14 and an upright portion 16. A case structure 18 for holding and displaying a movement as illustrated is mounted to the upper end of upright portion 16. Means are provided for allowing the case structure to be moved either closer to or further away from the base portion 14. In the particular embodiment illustrated, the means for moving case structure 18 closer to base portion 14 comprises a rivet 20 which secures case structure 18 to the upright portion 16. The rivet 20 allows the case structure to be easily rotated yet provide sufficient friction such that once the case structure has been rotated it will remain in the position that has been placed. The rivet is mounted into the back of the case structure such that the center line 21 of the rivet 20 is spaced a distance D from the center line 23 of the case structure 18 so that when the case structure 18 is rotated it will be moved from the further most position from the base portion 14 as illustrated in FIG. 1 to its closest position which is illustrated by dash lines in FIG. 2. The distance d1 between the outer surface of case structure 18 and base portion 14 may be selected as desired and can be easily selected by appropriately spacing the center line 21 of rivet from the center line 23 of the case structure. The case structure by simple rotation may be placed at an infinite number of heights with respect to the base portion 14 by simple rotation of the case structure with respect to the upright portion 16. In this way there is provided a very stable structure as the center of gravity is lowered thereby making it more difficult to knock over the instrument assembly when base 14 is placed on a wire rack or other supporting surface. This is particularly advantageous when the instrument assembly is simply placed on top of a wire rack.

In many other situations it may be more desirable to mount the instrument assembly more securely to the wire rack. Generally most wire racks comprise a plurality of parallel axially displaced wire elements which are held together by generally at least two wire elements extending perpendicular to the plurality of parallel wire elements. In the particular embodiment illustrated the wire elements are made of metal, however, the particular material from which the wire elements are formed may be of any material so desired, for example plastic. The size and the spacing of wire elements can vary over a wide variety of dimensions. The present invention provides effective means for firmly securing the instrument assembly to the wire rack and account for the wide variation in wire rack sizes.

Figure 3:
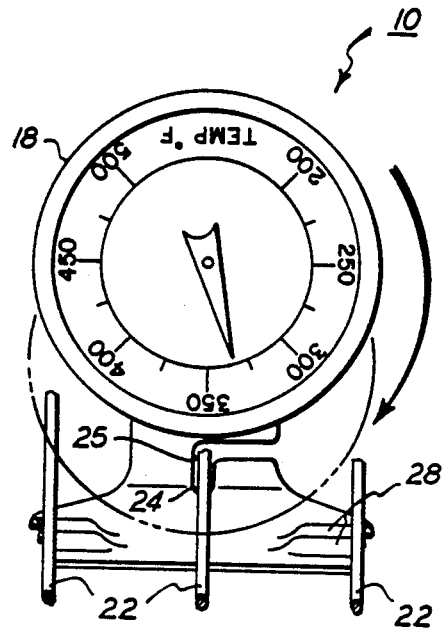
FIG. 3 is the instrument assembly of FIG. 1 secured to a portion of a wire rack.

In some situations it is desirable to mount the instrument on top of the wire rack. Referring to FIG. 3 there is illustrated the instrument assembly of the present invention mounted perpendicular to the length of the parallel wire elements 22. In the particular embodiment illustrated, the cross sectional shape of wire elements 22 is circular. However, the cross sectional shape may be varied as desired. The upright portion 16 is provided with a generally L shaped slot 25 having its open end facing one lateral side of the upright portion 16 and having a terminal end 24 which extends close approximately to the base portion 14. The terminal end is shaped to prevent lateral movement of the wire element 22 as the case structure 18 presses the wire element 22 against base portion 14. The slot 25 has a width sufficient to receive a single wire element 22 of the wire rack (not shown). The wire element 22 is received into slot 25 such that the wire element 22 will be clampingly engaged between the case structure 18 and the base portion 14 when the case structure is rotated closer to the base portion 14. Preferably, the terminal end 24 is disposed directly below the center line 21 of rivet 20. While not necessary it may be further desirable to design the base portion such that it has a length L such that it will extend past adjacent wire elements 22 of the rack.

Figure 2:
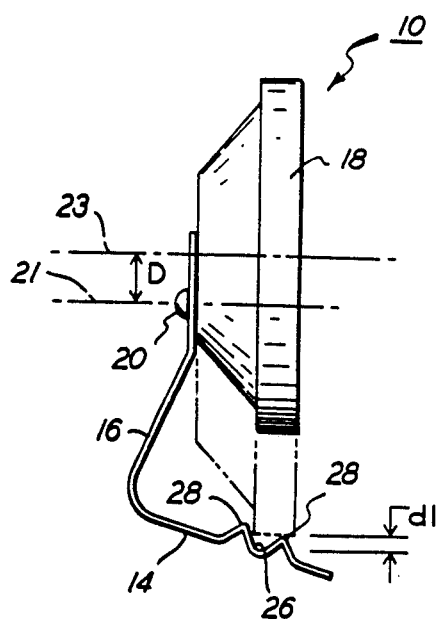
FIG. 2 is a side view of FIG. 1.
Figure 4:
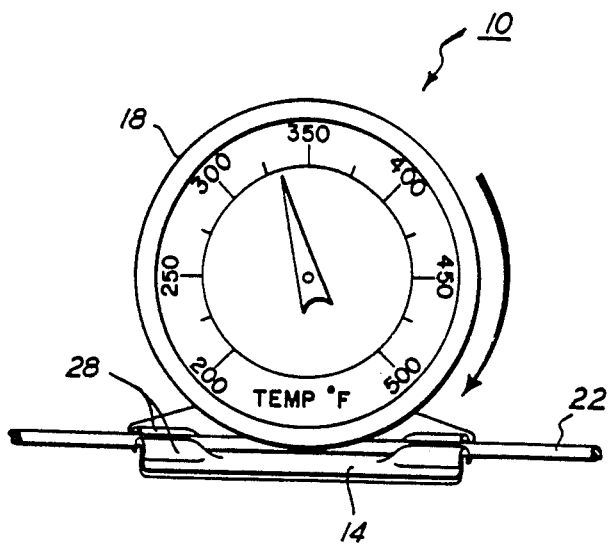
FIG. 4 is the instrument assembly of FIG. 1 showing an alternate method of securing the assembly to a portion of a wire rack.

Referring to FIG. 4, there is illustrated an alternate method of mounting the present invention where the case structure clampingly engages the wire element 22 along its length. As best seen in FIG. 2, the base portion 14 is provided with a recess 26 or receiving a wire element 22. In the particular embodiment illustrated a pair of projections 28 prevent lateral displacement of the wire element when the case structure is rotated to a binding relationship with the wire element. In the particular embodiment illustrated recess 26 is formed by a pair of spaced projections 28 at both ends of base portion 14, however, the recess 26 may be a recess in the base portion 14 below the upper surface thereof or even extended along the entire length of base portion 14. As in the other mounting the case structure 18 is rotated away from base structure to allow mounting of the device on the wire element 22 and once being mounted thereon the case structure is rotated so that the case structure clampingly engages the wire rack. In the particular embodiment illustrated, the outer surface of the case structure 18 is substantially straight, however, if desired the outer surface may be shaped so as to conform to the outer shape of the wire element 22.

Figure 5:
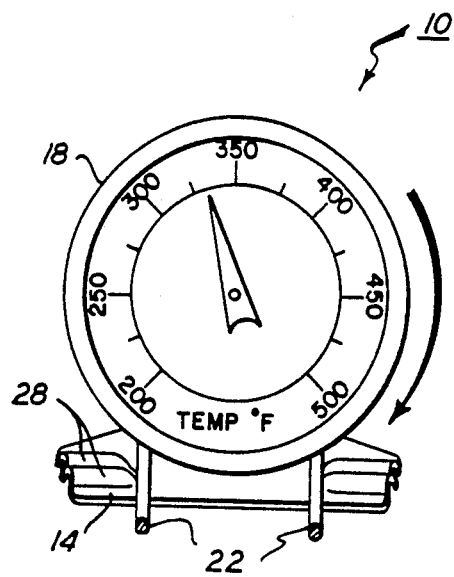
FIG. 5 is a view similar to FIG. 4 illustrating yet another alternate means for securing an instrument assembly to the wire rack.

Referring to FIG. 5 there is illustrated the instrument assembly of the present invention mounted in yet still another manner. In this particular mounting, the wire elements are shown running from front to back and the sizing of the case structure and its axial displacement from the base portion 14 is such that when the case structure 18 is rotated into its closest position to base portion 14, the wire elements will be clampingly engaged between the case structure on either side and the interior faces of the respective projections 28 arising from the base portion.

The case structure 18 and stand 12 are made of material to provide rigidity to the structure. Preferably, the stand is made of material such that when the wire element is clampingly engaged between the case structure 18 and base portion 14, the base portion 14 provides a spring like tensioning. Applicant has found that making the stand 12 and case structure 18 out of stainless steel sheet metal adequately provides this function. However, the present invention is not limited to such material.

Up to now the instrument assembly according to the present invention has been discussed as being mounted above the wire rack. In many environments, it may be desirable to have the case structure mounted below the wire rack. The instrument assembly may be mounted below the wire rack in much the same way previously discussed with respect to FIGS. 3-5 except that the case structure is now below the wire rack. The case structure is first rotated away from the base portion 14 and then engaged with the appropriate wire elements. The case structure 18 simply rotated closer to the base portion until the wire element 24 is clampingly engaged between the case structure 18 and base portion 14.

While the present invention is described with relationship to the particular embodiments illustrated, modifications may be made without departing from the scope of the present invention. For example, the recess 26 for receiving a wire element could be provided by a variety of different means and need not extend across the entire length of the base portion. The L-shaped recess in the upright portion 16 may take a variety of shapes and configurations not illustrated. The case structure may be elliptically shaped instead of circular as illustrated.

What is claimed is:

1. An instrument assembly adapted for mounting on a portion of a wire rack and comprising:
   a stand having a base portion and an upright portion;
   a case mounted on a pivot about a pivot center line to said upright portion of said stand, said case having a case periphery spaced from said base portion; and
   said case being rotatable with respect to said stand wherein upon such rotation, said case periphery approaches said base portion of said stand for clamping a wire portion therebetween and for thus securing said instrument assembly to said portion of a wire rack.

2. An instrument assembly as in claim 1 wherein said case periphery is disposed eccentrically with respect to the center line of the pivot such that rotation of the case with respect to the stand moves the case periphery alternatively toward and away from the base portion of said stand.

3. An instrument assembly as in claim 2 further including an L-shaped slot in said upright portion of said stand for receiving said wire rack portion thereon so that when said case structure is rotated closer to the said base portion, said wire rack portion is clamped between said case periphery and base portion.

4. An instrument assembly as in claim 2 further including means on said base portion for holding said wire rack portion to prevent displacement thereof as said case periphery is rotated into clamping engagement therewith.

5. An instrument assembly as in claim 4 wherein said holding means on said base portion comprises a recess.

6. An instrument assembly according to claim 5 wherein said recess is formed by at least two spaced apart projections extending from said base portion toward said case.

7. A thermometer for use with a portion of a wire rack and comprising a stand having a base portion and an upright portion, a thermometer case rotatably mounted on said upright portion of said stand, and selective rotation of said case moving said case closer to, or further away from, said base portion for respectively clamping a portion of a wire rack between said case and said base portion, or for releasing a portion of a wire rack clamped between said case and said base portion.

8. A thermometer as in claim 7 further comprising means on said base portion for holding a portion of said wire rack to prevent axial displacement thereof when said case is rotated into clamping engagement therewith.

9. A thermometer assembly according to claim 8 wherein said holding means on said base portion comprises a first recess.

10. A thermometer assembly according to claim 9 wherein said first recess is formed by at least two spaced apart projections extending from said base portion toward said case.

11. A thermometer assembly according to claim 10 including a second recess formed by two additional spaced apart projections extending from said base portion toward said case, said second recess being operatively aligned with said first recess for receiving an extension of the same wire rack portions.

12. An instrument assembly comprising a stand having a base portion and an upright portion, a case mounted to the upper portion of said upright portion of said stand, means pivoting said case to said upright portion eccentrically to produce variable height adjustment of the case with respect of the base portion and to thereby permit lowering of the center of gravity of said assembly, when said height is diminished, to increase stability of said assembly.

13. An instrument mountable on a wire and including:
a stand having an upright portion and a base portion;
an instrument case pivoted eccentrically to said upright portion about a pivot center line spaced from a case center line a predetermined distance, said case having a front, back and peripheral sides;
slot means in said upright portion for receiving an elongated wire extending in a first direction, from front to back when said instrument is to be mounted thereon;
recess means in said base portion for receiving an elongated wire extending in a direction from side to side of said case when said instrument is to be mounted thereon; and
rotation of said case causing said case to approach said base portion for clamping either of said respective elongated wires therebetween.

14. An instrument as in claim 13 wherein said recess means comprise two recesses defined by respective projections disposed proximate ends of said base portions, said respective projections having inwardly facing interior faces for engaging elongated wires extending in a direction from front to back of said case, and for clamping said elongated wires against said case.

15. An instrument assembly for mounting on a wire portion of a wire rack, said assembly having a front, back and sides, and comprising:
a stand having an upright portion and a base portion;
an instrument case pivoted eccentrically to said upright portions and having a case periphery;
respective means for holding elongated wire portions of said wire rack, running selectively from front-to-back and from side-to-side of said assembly, and for clamping engagement thereof by said case periphery.

* * * * *

UNITED STATES PATENT AND TRADEMARK OFFICE
CERTIFICATE OF CORRECTION

PATENT NO. : 4,746,225

DATED : May 24, 1988

INVENTOR(S) : John B. Ashe

It is certified that error appears in the above-identified patent and that said Letters Patent is hereby corrected as shown below:

Column 1, line 47, "the" should be --a portion of a--.

Column 4, line 65 "respect of" should be --respect to--.

Signed and Sealed this

Twenty-second Day of November, 1988

Attest:

DONALD J. QUIGG

*Attesting Officer*  *Commissioner of Patents and Trademarks*